United States Patent
Tanaka et al.

(10) Patent No.: US 9,369,018 B2
(45) Date of Patent: Jun. 14, 2016

(54) METHOD OF MANUFACTURING ROTATING ELECTRICAL MACHINE

(75) Inventors: Yuichiro Tanaka, Yokohama (JP); Takashi Ishigami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 756 days.

(21) Appl. No.: 13/702,260

(22) PCT Filed: Jun. 6, 2011

(86) PCT No.: PCT/JP2011/062907
§ 371 (c)(1),
(2), (4) Date: Feb. 14, 2013

(87) PCT Pub. No.: WO2011/155430
PCT Pub. Date: Dec. 15, 2011

(65) Prior Publication Data
US 2013/0140934 A1 Jun. 6, 2013

(30) Foreign Application Priority Data
Jun. 7, 2010 (JP) ................................. 2010-129525

(51) Int. Cl.
*H02K 15/00* (2006.01)
*H02K 3/04* (2006.01)
*H02K 15/095* (2006.01)
*H02K 15/04* (2006.01)
*H02K 3/28* (2006.01)
H02K 3/18 (2006.01)

(52) U.S. Cl.
CPC .. *H02K 3/04* (2013.01); *H02K 3/28* (2013.01); *H02K 15/045* (2013.01); *H02K 15/095* (2013.01); *H02K 3/18* (2013.01); *Y10T 29/49009* (2015.01); *Y10T 29/49073* (2015.01)

(58) Field of Classification Search
CPC ................... Y10T 29/49009; Y10T 29/53143; Y10T 29/49073; Y10T 29/5353; H02K 3/28
USPC ......... 29/596, 598, 602.1, 605, 606; 310/179, 310/184, 198, 208, 216.004
See application file for complete search history.

(56) References Cited

U.S. PATENT DOCUMENTS

| | | | | |
|---|---|---|---|---|
| 6,362,553 | B1 * | 3/2002 | Nakahara | ................. H02K 1/14 310/216.004 |
| 7,683,516 | B2 * | 3/2010 | Ishigami | ................ H02K 3/522 310/179 |
| 2003/0134522 | A1 | 7/2003 | Onose et al. | |
| 2005/0020147 | A1 | 1/2005 | Onose et al. | |
| 2009/0072653 | A1 | 3/2009 | Harada et al. | |

FOREIGN PATENT DOCUMENTS

| | | |
|---|---|---|
| JP | 2003-208928 A | 7/2003 |
| JP | 2008-109829 A | 5/2008 |
| JP | 2010-16970 A | 1/2010 |
| JP | 2010-119183 A | 5/2010 |

OTHER PUBLICATIONS

International Search Report with English translation dated Aug. 16, 2011 (two (2) pages).

* cited by examiner

*Primary Examiner* — Thiem Phan
(74) *Attorney, Agent, or Firm* — Crowell & Moring LLP

(57) ABSTRACT

A manufacturing method for manufacturing a rotating electrical machine equipped with a stator that includes a continuously wound coil unit achieved by continuously winding concentrated winding-type coils via cross wires, with coil wire having a rectangular section. The manufacturing method includes: mounting core segments, at which the coil wire is yet to be wound, at a core segment forward/backward moving mechanism; winding the coil wire with a winding track secured by driving the core segments forward/backward via the core segment forward/backward moving mechanism; setting faces of the coil wire in alignment by holding orientations of winding start wire and winding end wire at the concentrated winding-type coils at approximately 90° via open/close type chucks each equipped with a chuck forward/backward moving mechanism, with the open/close type chucks mounted at the core segment forward/backward moving mechanism; and forming the continuously wound coil unit by driving the core segments forward/backward via the core segment forward/backward moving mechanism, driving the open/close type chucks forward/backward and opening/closing the open/close type chucks.

4 Claims, 9 Drawing Sheets

METHOD OF MANUFACTURING ROTATING ELECTRICAL MACHINE

TECHNICAL FIELD

The present invention relates to a rotating electrical machine such as a motor or a power generator and it also relates to a manufacturing method for manufacturing the rotating electrical machine.

BACKGROUND ART

As a crucial part of worldwide efforts to reduce greenhouse gases and increase energy efficiency, the popularity of electrically driven vehicles is on the rise. An onboard motor needs to be installed in limited space and high output has to be obtained upon limited battery voltage. In order to satisfy the requirements of miniaturization and higher output, a concentrated winding-type motor may be configured with core segments so as to allow thick wire or rectangular wire to be wound with high density and thus improve the space factor.

In addition, as a means for providing less expensive motors, a continuously wound coil system, which reduces the number of connecting points, has been proposed.

Reflecting such technological developments in recent years, patent literature 1 discloses an example of a concentrated winding-type motor achieved by continuously winding rectangular wire at core segments. The motor disclosed in patent literature 1 is configured by continuously winding six same-phase coils and then connecting same-phase coil units through a Y connection.

CITATION LIST

Patent Literature

Patent literature 1: Japanese Laid Open Patent Publication No. 2008-109829

SUMMARY OF THE INVENTION

Technical Problem

However, while the number of coil connecting points can be reduced by adopting the structure disclosed in patent literature 1, there is an issue arising with regard to the art disclosed in patent literature 1 in that cross wires connecting individual coils are bound to physically interfere with one another at a coil end, resulting in the coil end protruding out to a rotor area or the core back and ultimately coming into contact with the rotor or the motor case. While this issue may be addressed by increasing the length of the cross wires, an increase in the length of the cross wires is bound to raise the coil end height. The structure also gives rise to concerns that the motor performance may be lowered (an increase in the ohmic loss or copper loss at the motor) and that the motor is bound to become more bulky and costly. Accordingly, an object of the present invention is to provide a more compact, lower-cost rotating electrical machine with improved output.

Solution to Problem

A manufacturing method, according to a first aspect of the present invention, for manufacturing a rotating electrical machine equipped with a stator that includes a continuously wound coil unit achieved by continuously winding concentrated winding-type coils via cross wires, with coil wire having a rectangular section, the manufacturing method comprising: mounting core segments, at which the coil wire is yet to be wound, at a core segment forward/backward moving mechanism; winding the coil wire with a winding track secured by driving the core segments forward/backward via the core segment forward/backward moving mechanism; setting faces of the coil wire in alignment by holding orientations of winding start wire and winding end wire at the concentrated winding-type coils at approximately 90° via open/close type chucks each equipped with a chuck forward/backward moving mechanism, with the open/close type chucks mounted at the core segment forward/backward moving mechanism; and forming the continuously wound coil unit by driving the core segments forward/backward via the core segment forward/backward moving mechanism, driving the open/close type chucks forward/backward and opening/closing the open/close type chucks.

According to a second aspect of the present invention, in the manufacturing method for manufacturing a rotating electrical machine according to the first aspect, it is preferable that three continuously wound coil units are formed through the manufacturing method; and the three continuously wound coil units are stacked and assembled in a ring shape by inclining the cross wires of two continuously wound coil units among the three continuously wound coil units toward an inner diameter side of a stator core with varying angles, and side faces of the cross wires in neutral point connection areas of the three continuously wound coil units and a connection surface of the connector terminal are oriented along a uniform direction.

A rotating electrical machine, according to a third aspect of the present invention, that includes the continuously wound coil unit formed by the manufacturing method for manufacturing a rotating electrical machine according to the first aspect, wherein faces of rectangular wire constituting the continuously wound coil unit are all set in alignment.

A rotating electrical machine, according to a fourth aspect of the present invention, that includes the continuously wound coil units formed by the manufacturing method for manufacturing a rotating electrical machine according to the second aspect, wherein the side faces of the cross wires at the neutral point connection areas of the three continuously wound coil units and the connection surface of the connector terminal are oriented along the same direction.

A rotating electrical machine, according to a fifth aspect of the present invention, equipped with a stator that includes a continuously wound coil unit achieved by continuously winding concentrated winding-type coils via cross wires, with coil wire having a rectangular section, wherein: faces of rectangular wire constituting the continuously wound coil unit are set in alignment.

A manufacturing method, according to a sixth aspect of the present invention, for manufacturing a rotating electrical machine equipped with a stator that includes a wound coil unit formed by winding concentrated winding-type coils via cross wires, with coil wire having a section that is not circular, the manufacturing method comprising: mounting core segments, at which the coil wire is yet to be wound, on a forward/backward moving mechanism; winding the coil wire at the core segments by moving the core segments forward/backward via the forward/backward moving mechanism; forming three winding coil units by holding orientations of winding start wire and winding end wire of the concentrated winding-type coils in place via chucks mounted at the forward/backward moving mechanism so as to orient faces of the coil wire in alignment along a predetermined direction, driving the core segments forward/backward via the forward/backward moving mechanism and driving the chucks forward/backward and opening/closing the chucks; and assembling the three wound coil units stacked in a ring shape by inclining the cross wires of two wound coil units among the three continuously wound coil units toward an inner diameter side of a stator core with varying angles, with side faces of the cross wires in neutral point connection areas of the three wound coil units and a connection surface of a connector terminal oriented along a uniform direction.

Advantageous Effect of the Invention

According to the present invention, a rotating electrical machine with improved output can be provided as a more compact unit at lower cost.

DESCRIPTION OF EMBODIMENTS

Figure 1:
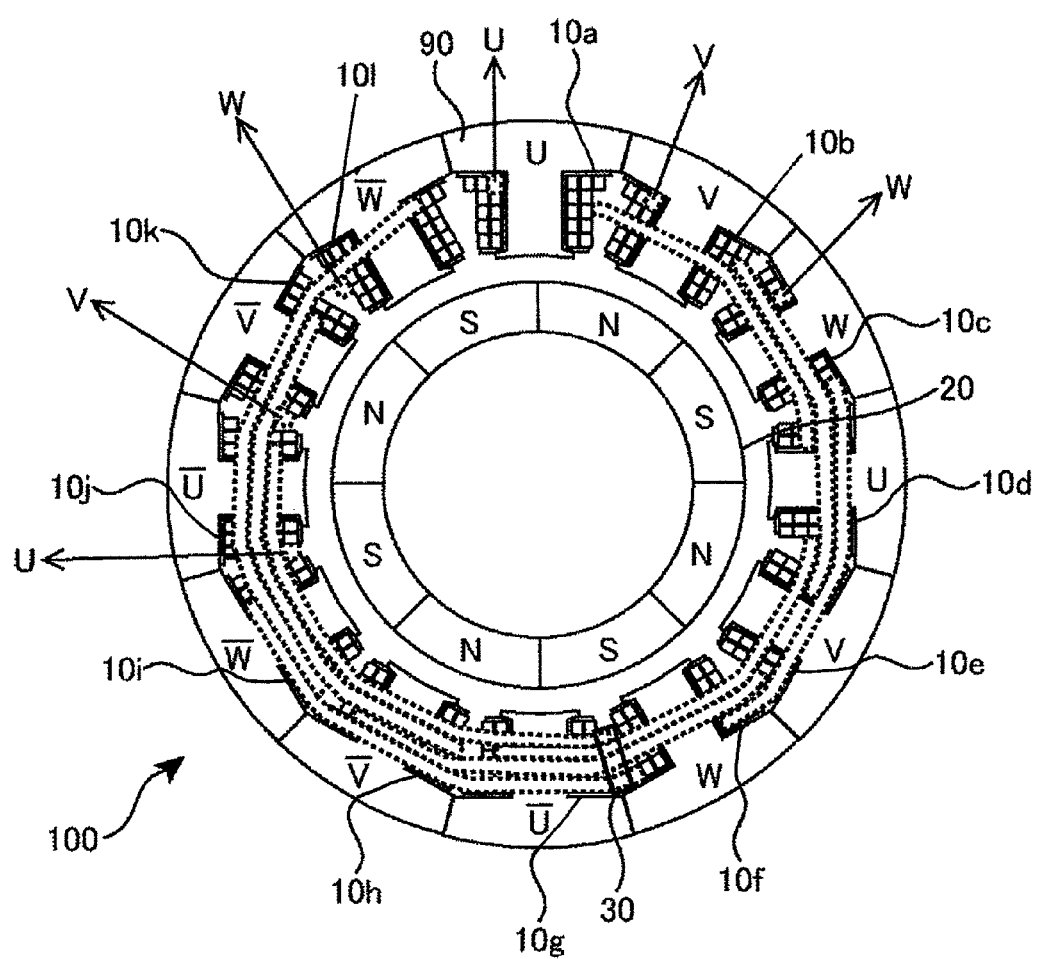
FIG. 1 is a schematic diagram illustrating the positional arrangement adopted for the cross wires for various phase coils at an 8-pole/12-slot motor achieved in an embodiment of the present invention.

The following is a description of an embodiment of the present invention.

The basic concept of the present invention is now briefly described. In the embodiment, core segments are first mounted at a mechanism that moves them forward/backward and a specific core segment at which a coil is to be wound is driven forward thereby securing a winding rotation track, so as to wind concentrated winding-type coils (coil elements) constituted with rectangular wire (wire having a rectangular section) continuously via cross wires. In order to keep the windings in neat alignment, side faces of the rectangular wire constituting the cross wires, need to be aligned with one another. Accordingly, a chuck mechanism that holds the rectangular wire is mounted atop each core segment and the rectangular wire is held by the chuck mechanism so as to keep it oriented at approximately 90°. Once the rectangular wire is led to a predetermined position within the core segment, the chuck mechanism is moved further backward so as to secure a winding track. After the wire is wound, the winding end wire is chucked and then the core segment is driven backward, thereby completing the winding process. As this operation is repeatedly executed, a continuously wound coil unit is created. Three continuously wound coil units, each corresponding to a specific phase, are created through this method. The cross wires for the continuously wound coil units corresponding to two phases are oriented so as to slightly incline toward the inner diameter side of the stator core so as to prevent any interference of the cross wires when the continuously wound coil units corresponding to the three phases are assembled together. A rotating electrical machine is configured by connecting neutral points via a connector terminal over the area where interference among the cross wires for the three phases has been eliminated as described above.

Through the process described above, a continuously wound coil unit for each phase is manufactured by continuously winding coil elements for the particular phase via rectangular wire, the continuously wound coil units for the three phases are assembled together and the neutral points are connected via the connector terminal, so as to configure a stator of a rotating electrical machine. Such a rotating electrical machine stator is characterized by an improvement in the regularity with which the coil elements are aligned within each core segment resulting in a better space factor, achieved by chucking the cross wires before and after the wire is wound and aligning all the side faces of the rectangular wire. In addition, by setting the cross wires at the continuously wound coil units corresponding to two phases so that they slightly incline toward the inner diameter side of the stator core in advance, it is ensured that the cross wires do not interfere with one another when the continuously wound coil units corresponding to the three phases are assembled together. Moreover, since the interference of the cross wires for the three phases is eliminated, the neutral point connection via the connector terminal is facilitated. This continuously wound coil system makes it possible to provide a motor at a lower price since the system eliminates the need for a conventional connection board to be used for terminal line connection in the related art and to simplify the connection process due to a smaller number of connecting points. In addition, the use of rectangular wire allows the motor to provide higher output while keeping down the coil end height, which makes it possible to achieve a reduction in the ohmic loss at the motor, miniaturization of the motor and a reduction in the cost of the motor.

The following is a detailed description of the embodiment, given in reference to the drawings.

FIG. 1 is a schematic diagram showing the positional arrangement with which the cross wires for the various coil elements are laid out in the motor achieved in the embodiment of the present invention. A motor 100 is an inner rotor motor configured by disposing a rotor 20 further inward relative to a stator 90. The motor 100 is a concentrated winding-type motor configured with core segments. The embodiment will be described by assuming that the motor 100 is an 8-pole/12-slot motor with rectangular wire used for coil conductors (coil wire). However, it will be obvious that the structure of the motor 100 described below simply represents an example and that the number of motor poles and the number of slots may be changed as long as the essential concept of the present invention remains intact. As shown in FIG. 1, the stator 90 is formed by connecting 12 core segments, at each of which a coil element among coil elements 10a through 10l is wound, so as to form a ring shape. The rotor 20 is disposed further inside relative to the stator 90 with a predetermined gap formed between them. Eight magnetic poles are formed at the outer circumference of the rotor 20 by disposing magnets so as to achieve alternate polarities, i.e., N polarity and S polarity, along the circumferential direction.

The four coil elements 10a, 10d, 10g and 10j corresponding to the U-phase in FIG. 1 are continuously wound via cross wires. The coil elements 10a and 10d are wound along one direction, whereas the coil elements 10g and 10j are wound along the opposite direction. The four coil elements 10b, 10e, 10h and 10k corresponding to the V-phase and the four coil elements 10c, 10f, 10i and 10l corresponding to the W-phase, too, are wound so as to form continuously wound coil units each having two coil elements wound along one direction and the remaining two coil elements wound along the opposite direction. This means that the neutral points of the four continuously wound coil elements corresponding to the U-phase, the four continuously wound coil elements corresponding to the V-phase and the four continuously wound coil elements corresponding to the W-phase in the motor 100 configured as described above are set at a single position located over the middle areas of the individual continuously wound coil units and a connector terminal 30 can be disposed at this position.

In this motor, the cross wires for the four continuously wound coil elements corresponding to the V-phase are set with a slight inclination toward the inner diameter side of the stator core, relative to the four continuously wound coil elements corresponding to the W-phase, and the cross wires for the four continuously wound coil elements corresponding to the U-phase are set with a slight inclination relative to the four continuously wound coil elements corresponding to the V-phase. As a result, interference among the cross wires is eliminated, which, in turn, prevents the coil end from protruding into the rotor area or the core back.

Figure 2:
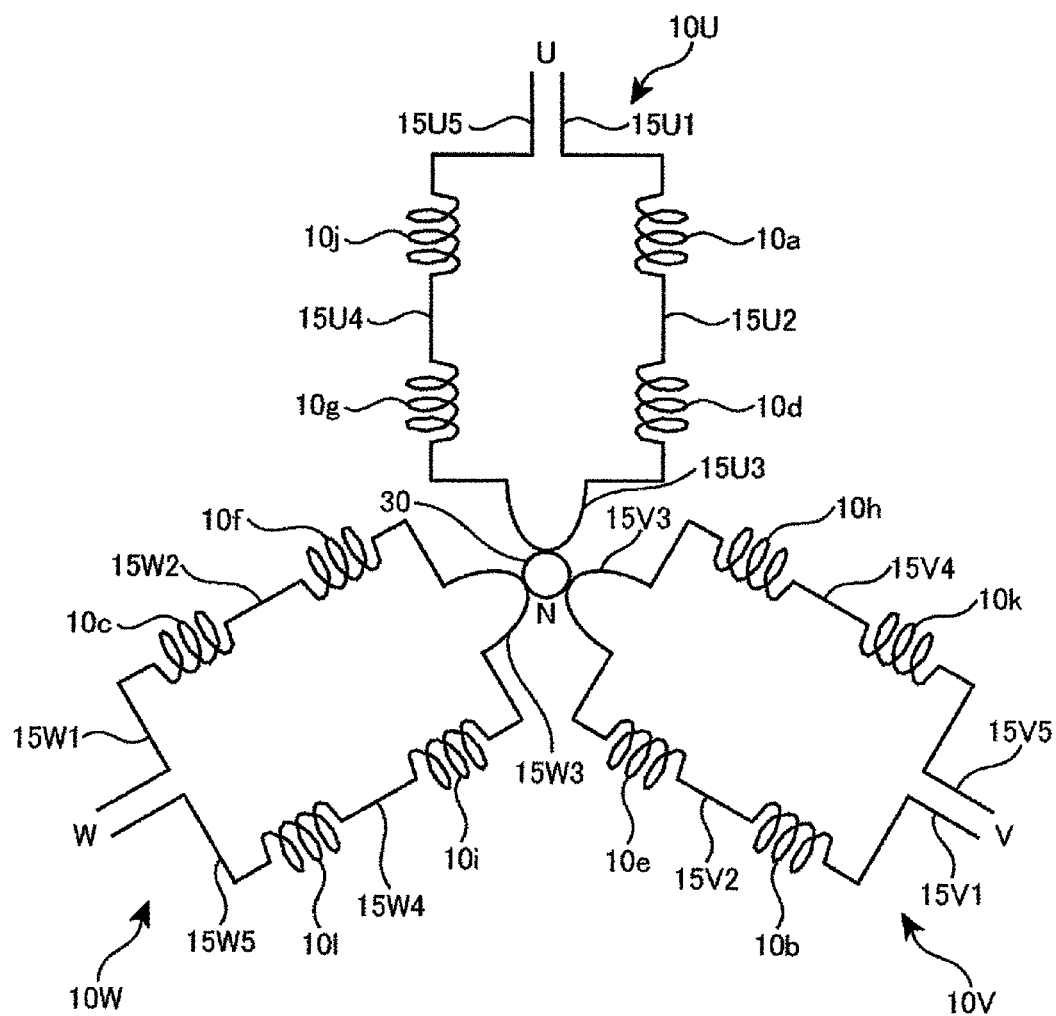
FIG. 2 is a connection diagram showing how the various phase coils are connected in the 8-pole/12-slot motor in the embodiment of the present invention.

FIG. 2 is a connection diagram pertaining to the stator 90 in the motor 100 according to the present invention.

A U-phase coil 10U is configured by connecting an input wire 15U1, the coil element 10a, a cross wire 15U2, the coil element 10d, a cross wire 15U3, the coil element 10g, a cross wire 15U4, the coil element 10j and an input wire 15U5. While the coil elements 10a and 10d are wound along one direction, the coil elements 10g and 10j are wound along the opposite direction. A V-phase coil 10V and a W-phase coil 10W are each formed by winding two coil elements along one direction and the remaining two coil elements along the opposite direction, as in the U-phase coil 10U. Namely, the motor 10 according to the present invention adopts a two serial+two parallel Y connection system. The middle areas of the U-phase coil 10U, the V-phase coil 10V and the W-phase coil 10W are respectively located at the cross wires 15U3, 15V3 and 15W3, and as the neutral points in these middle areas are connected via the connector terminal 30, the assembly is able to function as the stator 90.

Figure 3:
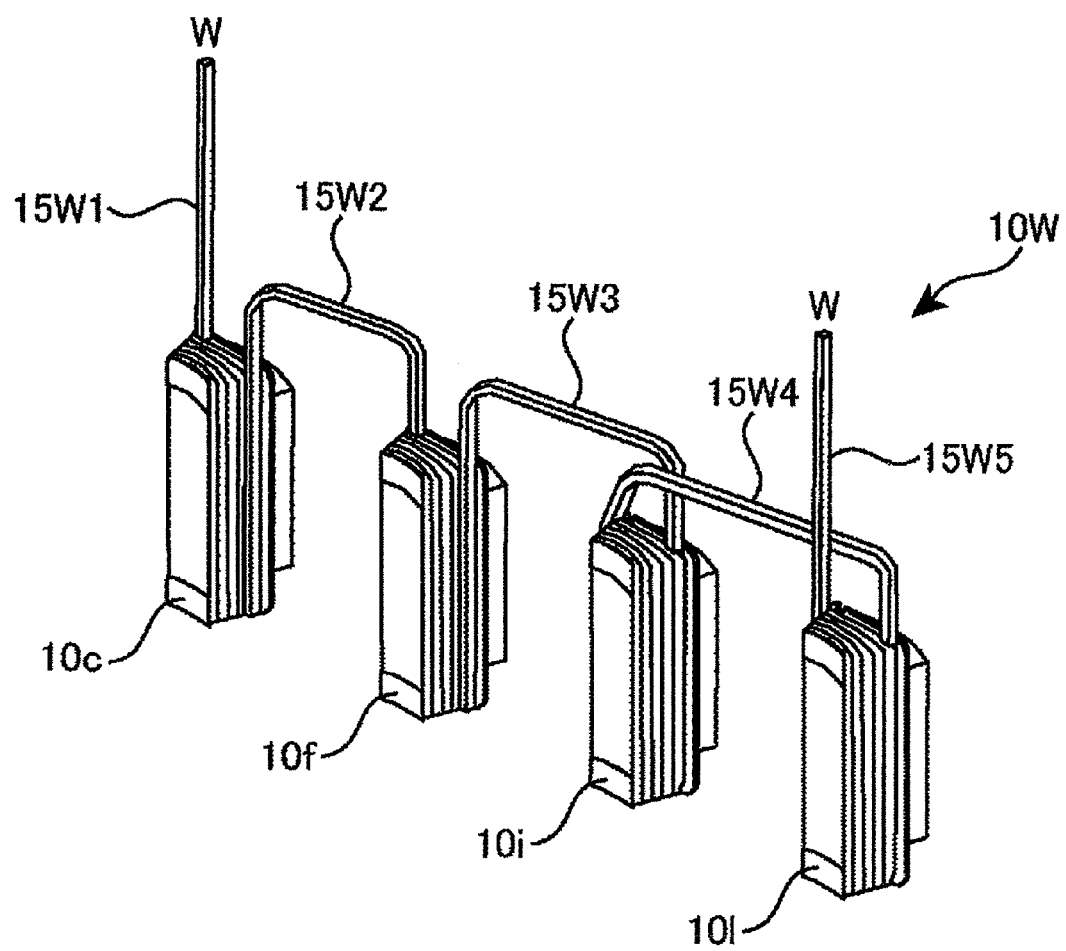
FIG. 3 is a perspective showing a structure adopted for four continuously-wound coils corresponding to a given phase in the embodiment of the present invention.

In reference to FIG. 3, the structure of a coil unit constituted with four continuously wound coil elements corresponding to a given phase, adopted in the embodiment of the present invention, is described in reference to the W-phase coil 10W. As shown in FIG. 3, the W-phase coil 10W includes the core elements 10c, 10f, 10i and 10l each wound at a core segment among the four core segments, which are set side-by-side and are continuously wound via cross wires 15W2, 15W3 and 15W4. The terminal wires 15W1 and 15W5 constitute input wires in this coil unit. The continuously wound coil unit in this example is characterized in that a specific winding method, to be described later, is adopted so as to align the side faces of all the rectangular wire constituting the continuously wound coil unit, including the cross wires. As a result, the coil elements in the core segments are all aligned with better regularity and thus, the space factor improves. The V-phase coil 10V and the U-phase coil 10U, too, adopt basic coil structures similar to that described above.

Figure 4:
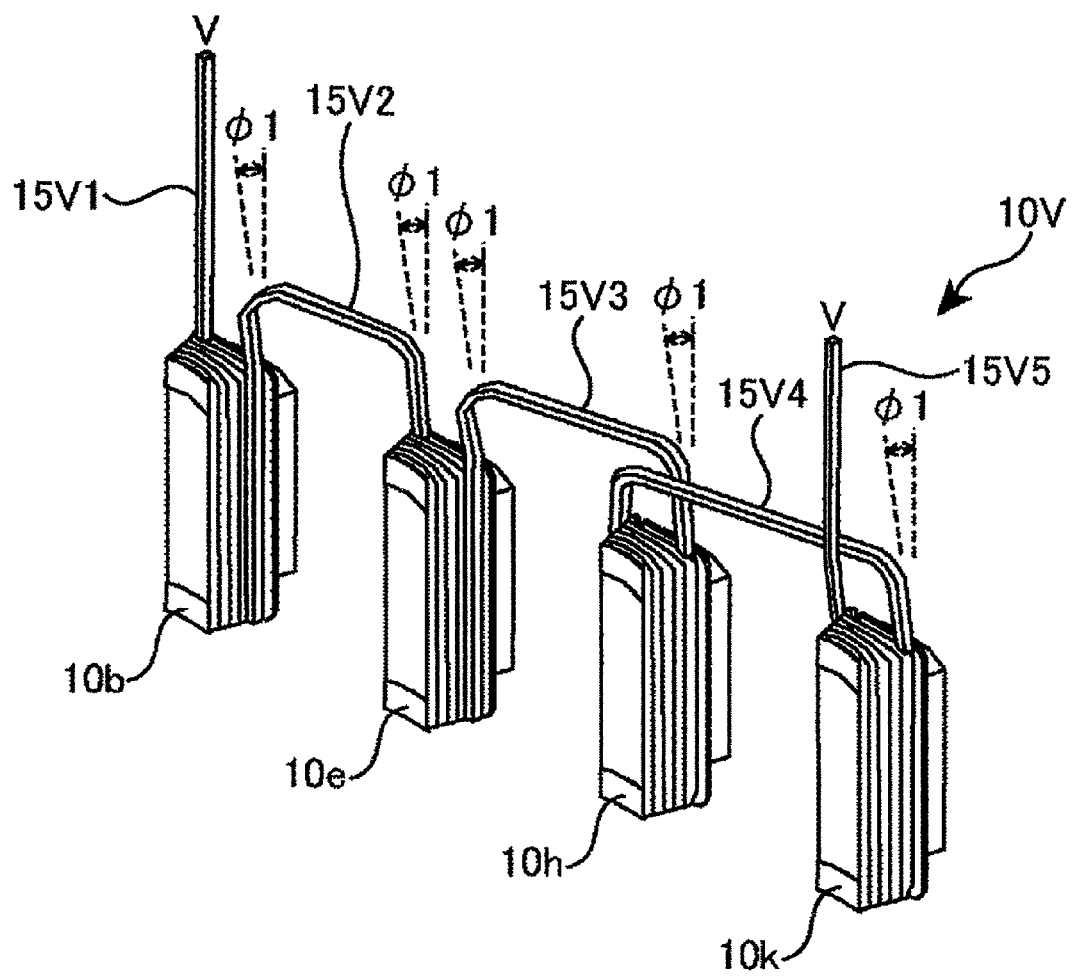
FIG. 4 is a perspective showing a structure adopted for four continuously-wound coils corresponding to a given phase in the embodiment of the present invention.

FIG. 4 shows the V-phase coil 10V. The V-phase coil 10V differs from the W-phase coil 10W in that cross wires 15V2, 15V3 and 15V4 connecting the various coil elements in the V-phase coil 10V and an input wire 15V5 are set with a slight inclination toward the inner diameter of the stator core by an angle $\phi 1$.

Figure 5:
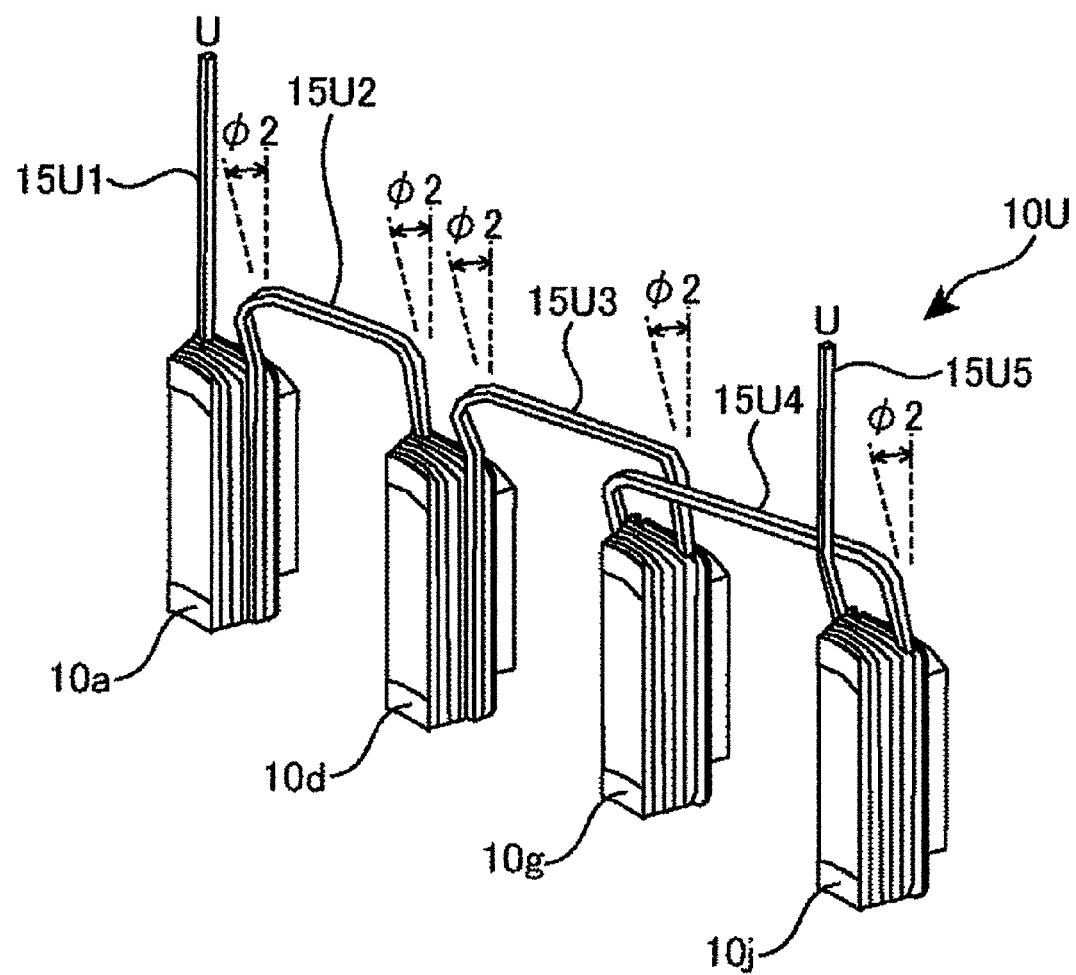
FIG. 5 is a perspective showing a structure adopted for four continuously-wound coils corresponding to a given phase in the embodiment of the present invention.

FIG. 5 shows the U-phase coil 10U. The U-phase coil 10U differs from the W-phase coil 10W in that the cross wires 15U2, 15U3 and 15U4 connecting the various coil elements in the U-phase coil 10U and an input wire 15U5 are set with a slight inclination toward the inner diameter of the stator core by an angle $\phi 2$, which is greater than $\phi 1$.

Figure 6:
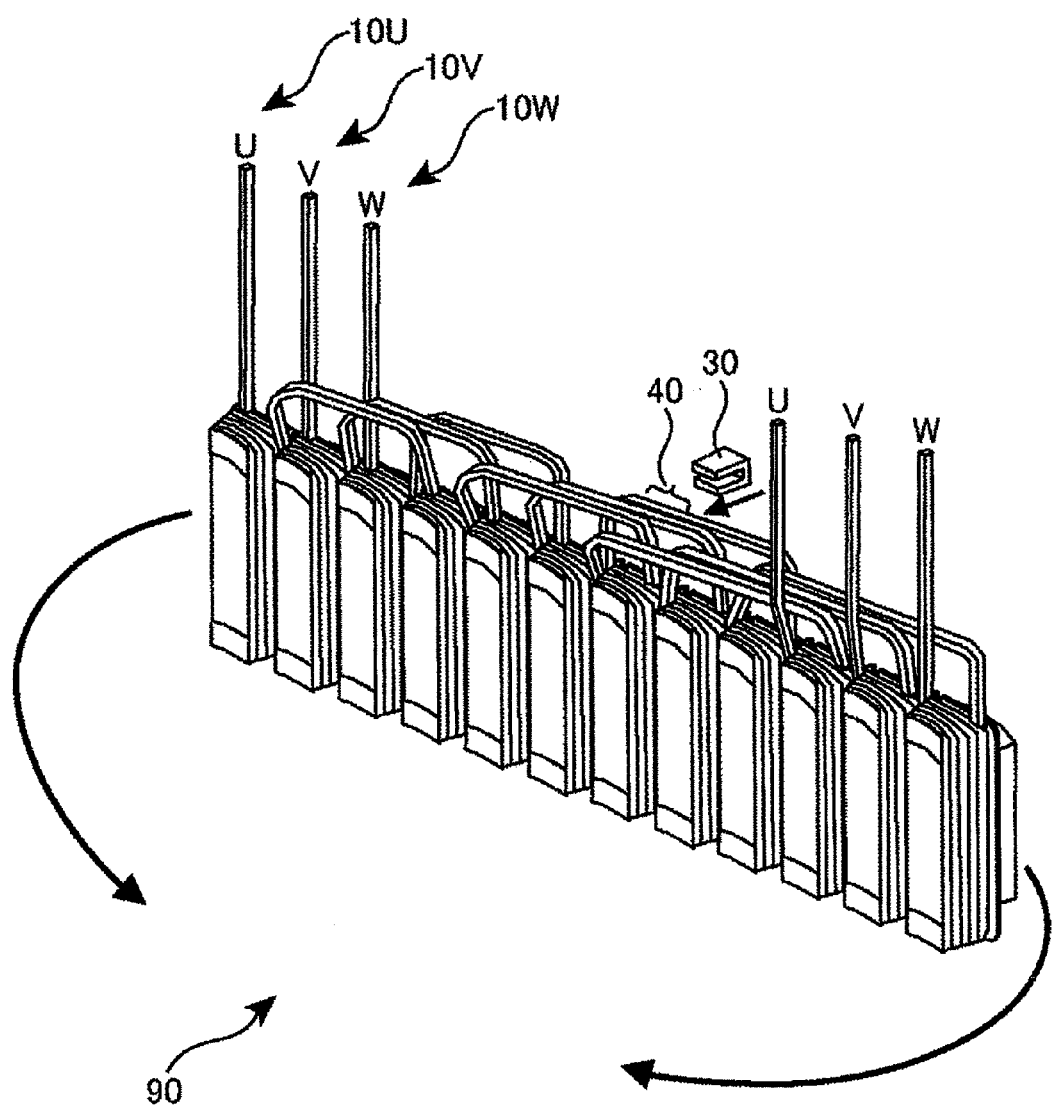
FIG. 6 is a perspective illustrating how the three sets of continuously wound coils, each constituted with four continuously wound coils and each corresponding to one of the three phases, are assembled together in the embodiment of the present invention.

FIG. 6 shows how the continuously wound coil units, each corresponding to one of the three phases and each constituted with four continuously wound coil elements, are assembled together in the embodiment of the present invention. The W-phase coil 10W, the V-phase coil 10V and the U-phase coil 10U are stacked in this order, with the coil elements in each coil unit laid side-by-side. Only in this assembled state, space where the neutral points of the coil units corresponding to the three phases are connected, i.e., a neutral point connecting area 40 is formed. Since the cross wires in the V-phase coil 10V and the U-phase coil 10U are inclined by the angle $\phi 1$ and the angle $\phi 2$ respectively, interference among the cross wires is eliminated and the coil end is not allowed to protrude into the rotor area or the core back.

Since the cross wires do not interfere with one another, the plurality of core segments can be set side-by-side in a single straight line, and thus the assembly process is facilitated. In addition, the cross wires can be laid out with a substantially uniform height, which makes it possible to reduce the coil end height. Connection work for the motor 100 can be completed by inserting the connector terminal 30 constituted of, for instance, a cladding material at the neutral point connection area 40, placing an electrode against the connector terminal 30 and fusing them together. The stator 90 is formed by bending the assembly of the three continuously wound coil units, each corresponding to one of the three phases and each constituted with four continuously wound coil elements, which are set side-by-side in a single straight line, as described above, so as to achieve a ring shape as indicated by the arrows in FIG. 6.

It is to be noted that while the cross wires for the three phases are connected via the connector terminal 30 in the neutral point connection area 40 in this example, the cross wires may be connected through a method other than this, as long as they are connected in the neutral point connection area 40. For instance, part of the enamel coating at the three-phase cross wires may be removed with a laser in advance, the exposed copper portions of the cross wires may be abutted together and connected through TIG welding or through ultrasonic soldering, without using the connector terminal 30. This alternative connection method, which does not require the connector terminal 30, makes it possible to provide the motor at a more affordable price.

Figure 7:
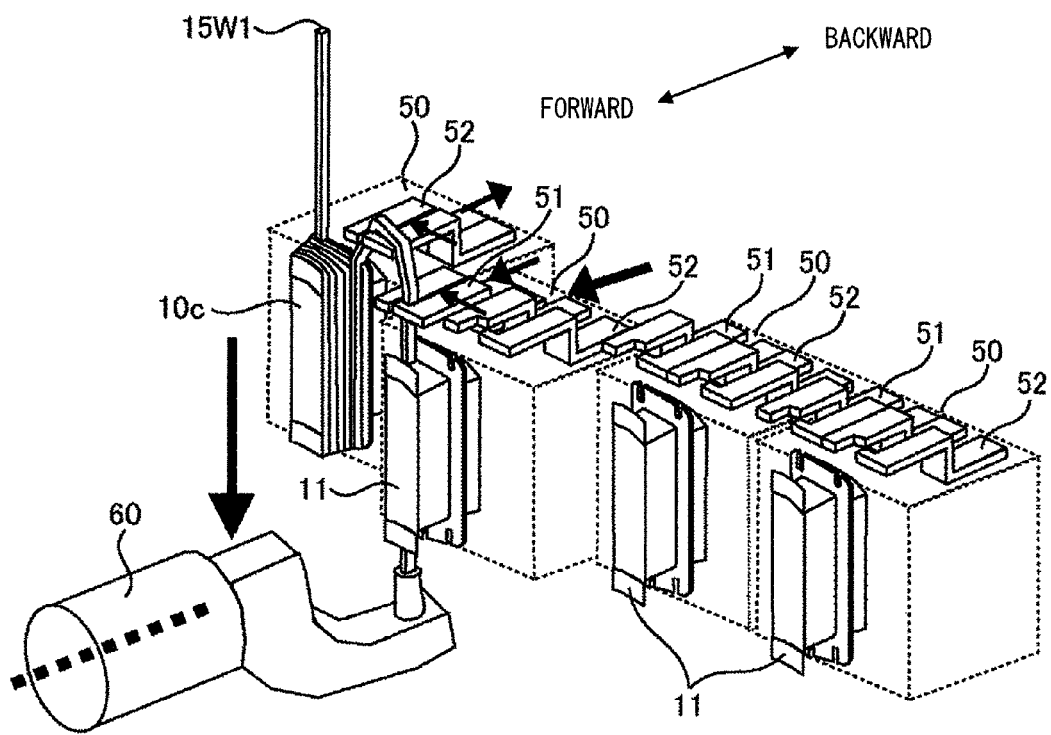
FIG. 7 is a perspective showing a winding start wire in the four continuously wound coils, corresponding to a given phase, led into a core segment in an embodiment of the present invention.
Figure 8:
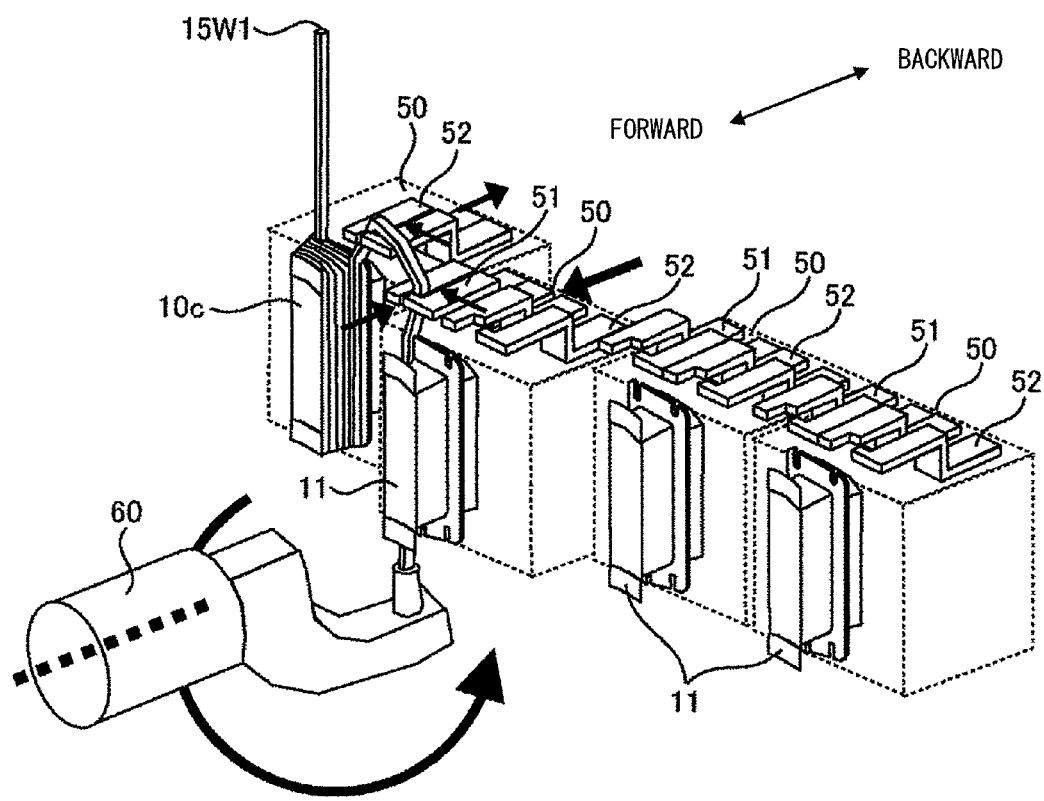
FIG. 8 is a perspective showing how a winding track may be secured by moving the winding start wire rearward in the four continuously wound coils corresponding to a given phase in the embodiment of the present invention.

FIGS. 7 and 8 show a winding method adopted when continuously winding four coil elements corresponding to a given phase in an embodiment of the present invention. As shown in FIG. 7, four core segments 11, set side-by-side in single file, are each mounted at a core segment forward/backward moving mechanism 50. The following is a description of how the coil element may be wound at the core segment 11 located second from the left in the figure. A nozzle 60 through which a rectangular wire is fed is disposed at the front end of a rotating mechanism (not shown). With this rotating mechanism, which is mounted on a triaxial orthogonal robot, the cross wires and the windings can be formed. In the following description, the direction toward the rotating mechanism (not shown) will be referred to as "forward" and the direction away from the rotating mechanism will be referred to as "backward". Once the winding process at the first core segment ends, the rectangular wire forming the winding end of the coil element 10*c* wound at the first core segment, with its orientation held at approximately 90°, is chucked with an open/close type chuck 52 and the open/close type chuck 52 is then driven backward. Subsequently, the coil element 10*c* is driven backward via the core segment forward/backward moving mechanism 50. When the orientation of the rectangular wire forming the winding end is held at approximately 90°, the locus of the central line through the section of the winding end wire forms an angle of approximately 90° relative to the central line of the cross wires (see FIGS. 3 through 5).

Then, the next winding target core segment 11, i.e., the second core segment 11, is driven forward via the core segment forward/backward moving mechanism 50. At this time, an open/close type chuck 51, too, is driven forward in an open state and the rectangular wire is guided into the core segment 11 while holding the nozzle 60 downward as indicated by the arrow by using the chuck 51 as a guide. Once the nozzle 60 is positioned at a predetermined point, the open/close type chuck 51 is closed and the rectangular wire at the winding start is fixed with its orientation held at approximately 90°. When the orientation of the rectangular wire at the winding start is held at approximately 90°, the locus of the central line through the section of the winding start wire forms an angle of approximately 90° relative to the central line of the cross wires (see FIGS. 3 through 5). The open/close type checks 51 and 52, disposed upon the core segment forward/backward moving mechanisms 50, each include a chuck driving mechanism that allows the open/close type chuck 51 or 52 to move forward/backward and open/close on its own.

Next, the open/close type chuck 51 is moved backward so as to secure the track of winding to be fed through the nozzle 60, as shown in FIG. 8. By holding the orientation of the rectangular wire at approximately 90° both at the winding start and at the winding end as described above, the rectangular wire orientation can be sustained through the core segment, which, in turn, makes it possible to assure regularity in the rectangular wire alignment and improve the space factor. Once the winding process is completed, an open/close type chuck 52 is driven forward in an open state and the winding end wire is hooked and chucked at the chuck 52, thereby completing the winding process at the second core segment. All together, the operation described above is repeated four times to manufacture the continuously wound coil unit constituted with the four continuously wound coil elements, in correspondence to the particular phase. While the nozzle 60 is rotated in the example described above, it will be obvious that a similar continuously wound coil unit constituted with four continuously wound coil elements can be formed by rotating the work side (the overall mechanism, excluding the nozzle 60, having been described in reference to FIGS. 7 and 8) while holding the nozzle 60 at a fixed position.

Figure 9:
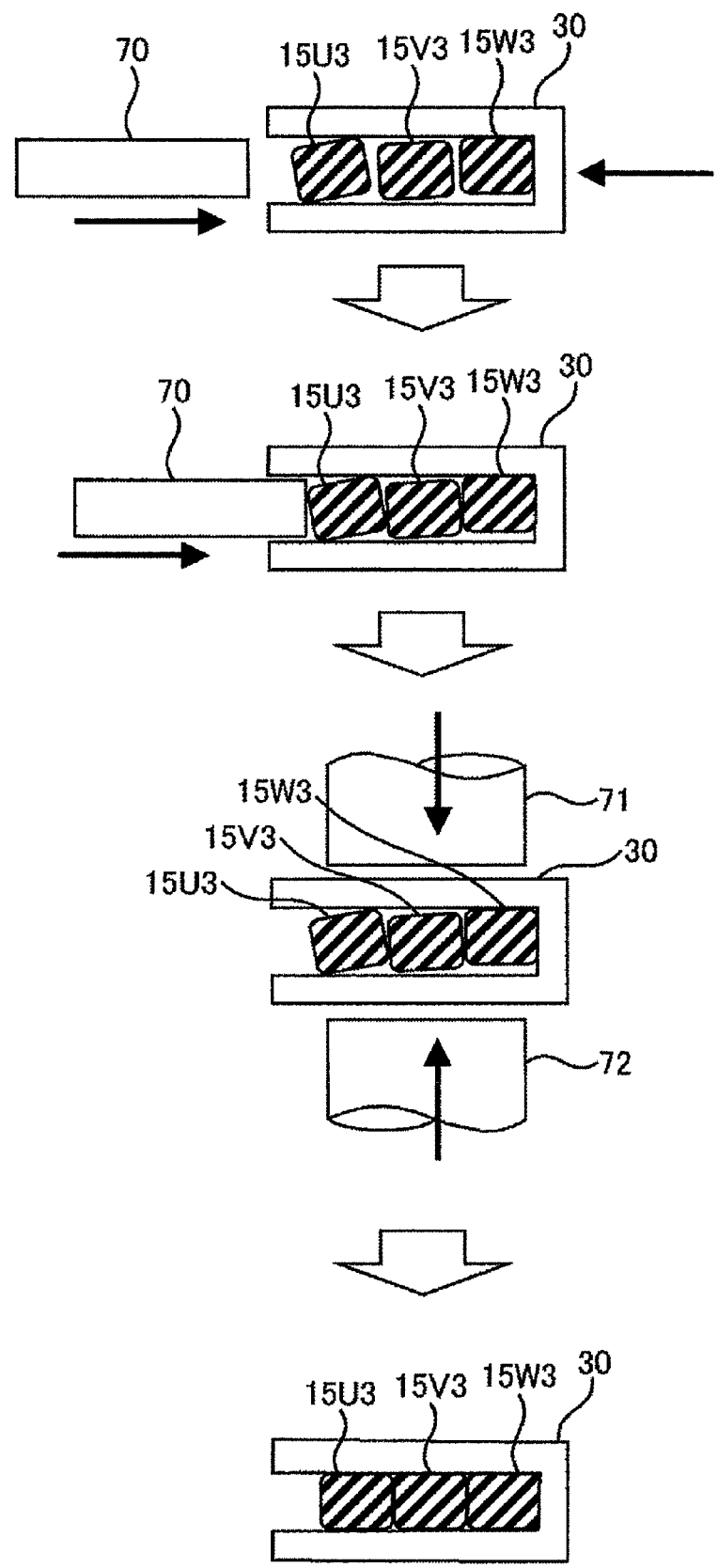
FIG. 9 illustrates in sectional views how the neutral points of the three sets of continuously wound coils, each constituted with four continuously wound coils and each corresponding to one of the three phases, are connected in the embodiment of the present invention.

FIG. 9 provides sectional views, illustrating how the neutral points of the three continuously wound coil units, each corresponding to one of the three phases and each constituted with the four continuously wound coil elements, may be connected in the embodiment of the present invention. As shown in FIG. 9, while the cross wires 15W3, 15V3 and 15U3 at the coil units corresponding to the three phases assume substantially matching heights and the side faces of the rectangular wire constituting the cross wires 15W3, 15V3 and 15U3 are substantially in alignment (see FIG. 6), the orientations of the strands of rectangular wire do not completely match. The method described below represents an example of a method through which an ample contact area for the connector terminal and the cross wires, to be connected through fusing, is assured. First, the cross wires 15W3, 15V3 and 15U3 are inserted into the connector terminal 30. Next, a ramming block 70 is inserted at the connector terminal 30 so as to press the cross wires 15W3, 15V3 and 15U3 against the connector terminal 30. As a result, the rectangular wire comes into contact with each other. Then, power is supplied with electrodes 71 and 72 pressed respectively against the top side and the bottom side of the connector terminal 30. As power is supplied, the connector terminal 30 becomes heated and the enamel coating at the faces of the rectangular wire becomes melted. The heat and pressure applied by the electrodes 71 and 72 cause the enamel to be pushed out of the connector terminal 30 and, as a result, the conductor portions of the three rectangular wires become bonded to the connection surfaces (inner wall surfaces) of the connector terminal 30. Through this method, the side faces of the conductor portions of the three rectangular wires and the connection surfaces at the connector terminal 30 are all oriented along the same direction, and thus, an ample contact area can be secured to allow power to be reliably supplied to the motor.

It is to be noted that while rectangular wire (with a square or rectangular section) is used in the embodiment described above, it is not strictly necessary that the present invention be adopted in conjunction with wire achieving an exactly rectangular shape and the present invention allows for minor adjustments with regard to the shape of the wire in line with the particulars of design specifications. For instance, the conductor used to form coils may take on a slightly beveled shape (a substantially octagonal shape) achieved by beveling the corners of a rectangle. Furthermore, the present invention may be adopted in conjunction with a conductor formed in another shape as long as it does not have a circular section. Moreover, the coil winding corresponding to each phase may be formed by connecting a plurality of coil elements via cross wires.

It is to be noted that the embodiment described above simply represents an example and the present invention is in no way limited to this example as long as the features characterizing the present invention remain intact. Any other mode conceivable within the technical range of the present invention should, therefore, be considered to be within the scope of the present invention.

The disclosure of the following priority application is herein incorporated by reference:
Japanese Patent Application No. 2010-129525 filed Jun. 7, 2010

The invention claimed is:
1. A manufacturing method for manufacturing a rotating electrical machine equipped with a stator that includes a continuously wound coil unit achieved by continuously winding concentrated winding-type coils via cross wires, with coil wire having a rectangular section, the manufacturing method comprising:

mounting core segments, at which the coil wire is yet to be wound, at a core segment forward/backward moving mechanism;

winding the coil wire with a winding track secured by driving the core segments forward/backward via the core segment forward/backward moving mechanism;

setting faces of the coil wire in alignment by holding orientations of winding start wire and winding end wire at the concentrated winding-type coils at approximately 90° via open/close type chucks each equipped with a chuck forward/backward moving mechanism, with the open/close type chucks mounted at the core segment forward/backward moving mechanism; and forming the continuously wound coil unit by driving the core segments forward/backward via the core segment forward/backward moving mechanism, driving the open/close type chucks forward/backward and opening/closing the open/close type chucks.

2. The manufacturing method for manufacturing a rotating electrical machine according to claim 1, wherein:

three continuously wound coil units are formed through the manufacturing method; and the three continuously wound coil units are stacked and assembled in a ring shape by inclining the cross wires of two continuously wound coil units among the three continuously wound coil units toward an inner diameter side of a stator core with varying angles, and side faces of the cross wires in neutral point connection areas of the three continuously wound coil units and a connection surface of the connector terminal are oriented along a uniform direction.

3. A rotating electrical machine equipped with a stator that includes a continuously wound coil unit achieved by continuously winding concentrated winding-type coils via cross wires, with a coil wire having a rectangular section, rotating electrical machine comprising:

core segments, at which the coil wire is yet to be wound, mounted at a core segment forward/backward moving mechanism; and a winding track, for winding the coil wire, secured by driving the core segments forward/backward via the core segment forward/backward moving mechanism;

wherein faces of the coil wire are set in alignment by holding orientations of winding start wire and winding end wire at the concentrated winding-type coils at approximately 90° via open/close type chucks each equipped with a chuck forward/backward moving mechanism, with the open/close type chucks mounted at the core segment forward/backward moving mechanism;

wherein the continuously wound coil unit is formed by driving the core segments forward/backward via the core segment forward/backward moving mechanism, driving the open/close type chucks forward/backward and opening/closing the open/close type chucks; and wherein faces of rectangular wire constituting the continuously wound coil unit are all set in alignment.

4. A rotating electrical machine equipped with a stator that includes a continuously wound coil unit achieved by continuously winding concentrated winding-type coils via cross wires, with a coil wire having a rectangular section, rotating electrical machine comprising:

core segments, at which the coil wire is yet to be wound, mounted at a core segment forward/backward moving mechanism; and a winding track, for winding the coil wire, secured by driving the core segments forward/backward via the core segment forward/backward moving mechanism;

wherein faces of the coil wire are set in alignment by holding orientations of winding start wire and winding end wire at the concentrated winding-type coils at approximately 90° via open/close type chucks each equipped with a chuck forward/backward moving mechanism, with the open/close type chucks mounted at the core segment forward/backward moving mechanism;

wherein the continuously wound coil unit is formed by driving the core segments forward/backward via the core segment forward/backward moving mechanism, driving the open/close type chucks forward/backward and opening/closing the open/close type chucks; and wherein the side faces of the cross wires at the neutral point connection areas of the three continuously wound coil units and the connection surface of the connector terminal are oriented along the same direction.

* * * * *